United States Patent
Aurora

(10) Patent No.: US 6,328,653 B1
(45) Date of Patent: Dec. 11, 2001

(54) SUPPORT DEVICE FOR ELEMENTS PROTECTING ROTATING SHAFTS, IN PARTICULAR TELESCOPIC CARDANIC SHAFTS

(75) Inventor: Igino Aurora, Miglianico (IT)

(73) Assignee: Eurocardan S.p.A., Atesso (CH) (IT)

( * ) Notice: Subject to any disclaimer, the term of this patent is extended or adjusted under 35 U.S.C. 154(b) by 0 days.

(21) Appl. No.: 09/505,697

(22) Filed: Feb. 17, 2000

(30) Foreign Application Priority Data

Feb. 18, 1999 (IT) .............................. RM99A0110

(51) Int. Cl.$^7$ ....................................... F16C 1/28
(52) U.S. Cl. ..................... 464/134; 464/178; 464/175; 384/536; 384/504
(58) Field of Search ..................... 464/134, 905, 464/178, 173, 185, 175; 384/536, 512, 510, 505, 504, 502, 499

(56) References Cited

U.S. PATENT DOCUMENTS

| | | | | |
|---|---|---|---|---|
| 651,376 | * | 6/1900 | Morrill et al. | 464/178 |
| 1,886,219 | * | 11/1932 | Parker | 464/178 |
| 2,510,659 | * | 6/1950 | Ristow | 464/178 |
| 2,793,512 | * | 5/1957 | Larsen | 464/178 |
| 2,919,562 | * | 1/1960 | Weasler | 464/178 |
| 3,044,278 | * | 7/1962 | Geisthoff | 464/178 |
| 3,044,279 | * | 7/1962 | Atkinson | 464/178 |
| 3,053,062 | * | 9/1962 | Geisthoff | 464/178 |
| 3,136,140 | * | 6/1964 | Atkinson | 464/178 |
| 3,703,089 | * | 11/1972 | Geisthoff | 464/178 |
| 4,443,207 | * | 4/1984 | Buthe et al. | 464/175 |
| 4,647,230 | * | 3/1987 | Friedrich et al. | 384/504 |
| 4,925,322 | * | 5/1990 | Hishida | 384/505 |

\* cited by examiner

Primary Examiner—Lynne H. Browne
Assistant Examiner—Kenn Thompson
(74) Attorney, Agent, or Firm—Browdy and Neimark

(57) ABSTRACT

The present invention relates to a support device for elements protecting rotating shafts, in particular telescopic cardanic shafts, wherein, in each semi-shaft terminating with a fork, is present an inner rolling race for balls, race which is obtained circumferentially exterior in a cylindrical portion of the fork and an outer rolling race on two semi-shells coaxial to the fork and mutually opposite, and a cage for the balls. The semi-shells are contained between the ring nut, provided with retaining edges, and the cylindrical fork portion.

2 Claims, 2 Drawing Sheets

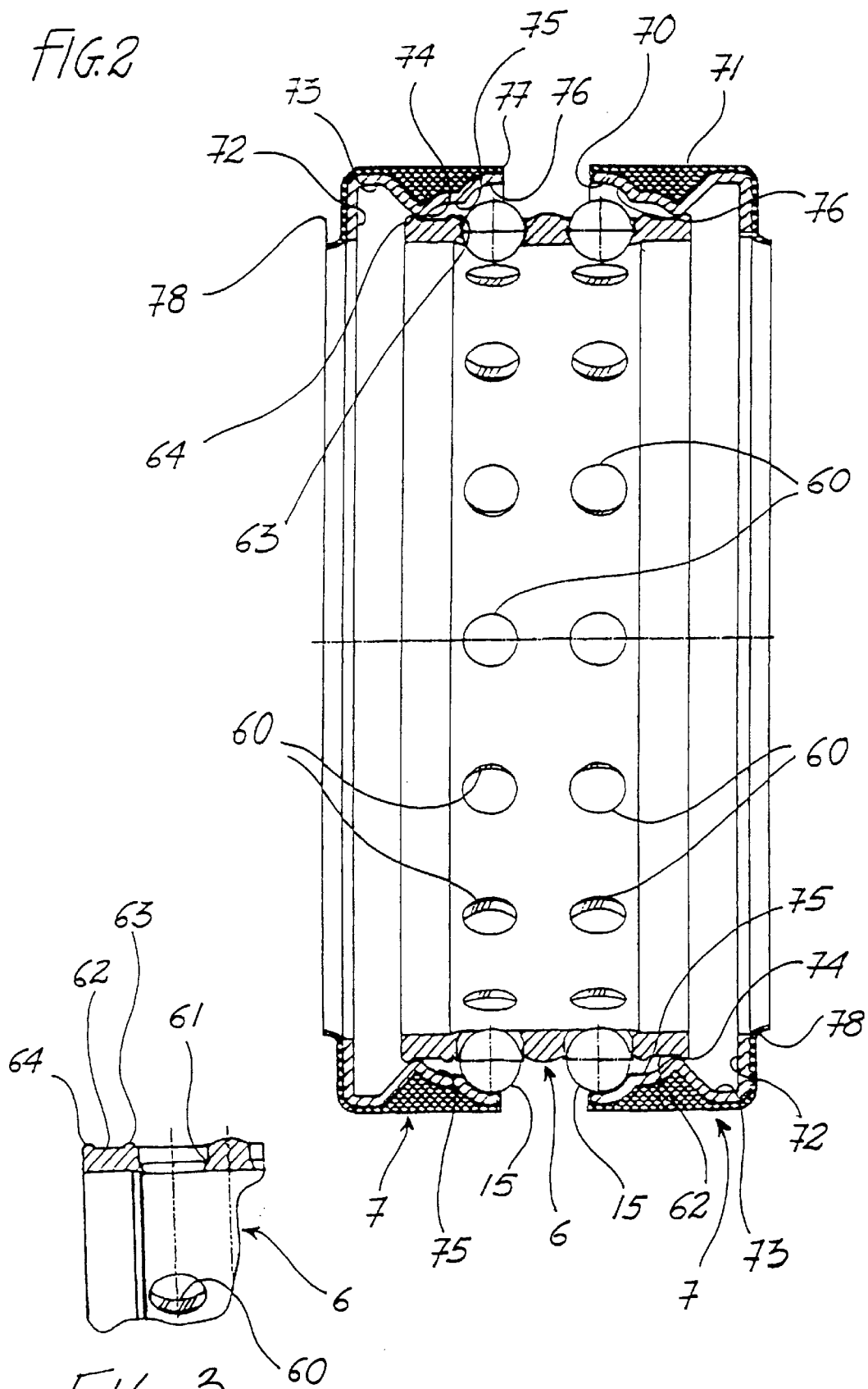

SUPPORT DEVICE FOR ELEMENTS PROTECTING ROTATING SHAFTS, IN PARTICULAR TELESCOPIC CARDANIC SHAFTS

BACKGROUND OF THE INVENTION

The present invention relates to a support device for elements protecting rotating shafts, in particular telescopic cardanic shafts.

Currently, mostly due to the codes pertaining to the "CE" mark, cardanic shafts are surrounded by protecting elements which must remain motionless while the shaft rotates at speeds which can reach and exceed even 1000 rotations/minute. The protecting elements therefore must be supported on the rotating shaft by devices that allow their mutual rotation, whilst assuring their positioning. Moreover, the set must be able to be disassembled, for any maintenance operation which may be required, and reassembled.

A currently known support device for such protecting elements is the type wherein a protecting tube is fastened externally to the related telescopic semi-shaft by means of a ring nut, whose inner edge is inserted able slidingly to pivot inside a corresponding groove obtained in the fork of the semi-shaft For this purpose, the ring nut presents circumferential projections which are engaged in corresponding slots obtained in the protecting tube.

Moreover, the ring nut, made of plastic material, presents a through cut to allow it to be widened and then opened in order to insert its inner edge into the groove of the fork and force it to remain therein. The inner edge of the ring nut, which is thus subjected to rubbing, must be lubricated periodically by means of a lubricator.

A disadvantage of this prior art support device consists of the fact that, although the edge is made of plastic material with low friction coefficient, over time it becomes worn. This is also due to the fact that lubrication is not optimal, the edge being discontinuous to allow for the ring nut to be widened during its mounting. Furthermore, the ring nut-fork coupling is exposed to dust and to contaminants in general, with the consequent loss of lubricating grease.

The wear of the ring nut edge leads to the loosening of the shaft-protection coupling, and possibly to its rupture, with the consequent detachment of the elements protecting the telescopic shaft.

SUMMARY OF THE INVENTION

The purpose of the present invention therefore is to eliminate the aforementioned drawbacks, aiming to provide a coupling between protecting elements and shaft which is durable, has reduced maintenance requirements, is small in size and, at the same time, is easy to use.

The invention, as it is characterized by the claims that follow, solves the problem of providing a support device for elements protecting rotating shafts, in particular telescopic cardanic shafts, of the kind wherein, in each semi-shaft terminating with a fork, is present a support ring nut engaged with a protective casing and with a protective tube and surrounded by a sealing sleeve, which from a general point of view is comprising at least an inner rolling race for rolling elements obtained circumferentially external in a cylindrical part of said fork, and at least an outer rolling race on two semi-shells coaxial to said cylindrical fork portion and mutually opposite, and a cage for said rolling elements; said semi-shells being contained between said ring nut, provided with retaining borders, and said cylindrical fork portion.

BRIEF DESCRIPTION OF THE DRAWINGS

Further features and advantages of the present invention shall become more readily apparent from the detailed description that follows, of a preferred embodiment illustrated purely by way of non limiting indication in the accompanying drawings wherein:

FIG. 2 shows, in enlarged scale, a longitudinal section of a ball bearing engaged in the support device for the protective elements of the present invention;

FIG. 3 shows a longitudinal section of an enlarged detail of the ball cage of FIG. 2.

DESCRIPTION OF THE PREFERRED EMBODIMENTS

Figure 1:
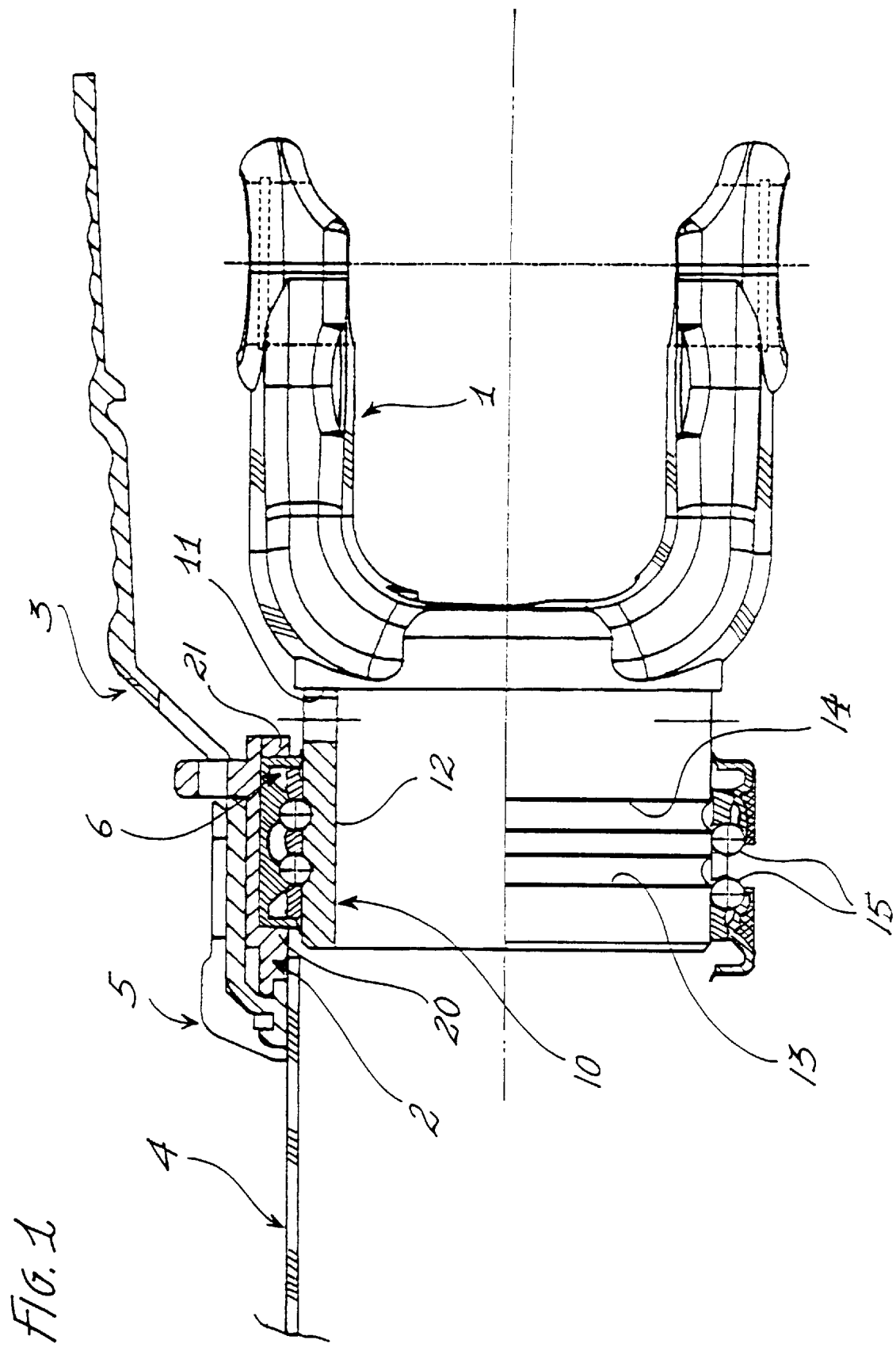
FIG. 1 shows in the upper half a longitudinal section of a telescopic cardanic semishaft and in the lower half a partial side view of a support device of the protective elements according to the invention, in the lower half in the mounting phase, in the upper half in the condition of completed mounting.

In accordance with the present invention, in the figures the reference number 1 indicates a fork for cardanic semi-shaft (not shown), the number 2 a ring nut engaged with a protective casing 3 and with a protective tube 4, and the number 5 indicates a sealing sleeve 5.

A cylindrical portion 10 of the fork 1 is conventionally provided with a hole 11 for inserting a pin for locking the tubular portion (not shown) of the cardanic semi-shaft received in the cylindrical cavity 12.

According to the invention, on the cylindrical part 10 of the fork 1 are obtained, circumferentially exterior, two internal rolling races 13, 14 for balls indicated generically as 15.

The balls 15 are contained inside a cage indicated in its entirety with the number 6, more easily visible in FIGS. 2 and 3. The cage 6 has an annular shape with its inner diameter slightly greater than the outer diameter of the cylindrical portion 10 of the fork 1. The cage 6 is provided with through holes, indicated overall as 60, as seats for housing the balls 15. The holes 60 present, on the inner side, an edge 61, able to prevent each ball from traversing the related hole towards the interior of the cage. The cage 6 is also provided with side bands 62, delimited by projecting diametrical borders 63 and 64, whose function shall become readily apparent hereafter.

The outer rolling races for the balls 60 are constituted by two semi-shells, indicated as 7. Each of the semi-shells 7 for the two rows of balls 15 comprises a metal core 70 and a coating 71 made of rubber or similar material. Each semi-shell 7 presents an inner profile constituted by a lateral wall 72 with radial development which, after a longitudinal segment 73, radially narrows to form a cusp 74, subsequently widening into two arcs of circle 75, 76. The first arc 75, adjacent to the cusp 74, constitutes the outer rolling race of a row of balls, as shown in FIG. 1, whilst the second arc 76, radially exterior relative to the first arc 75 constitutes the seat for the containment of the balls during the mounting phase, as shall become readily apparent below.

The rubber coating 71 covers the entire outer profile of each semi-shell starting from the extremity 77 facing the opposite semi-shell to the lateral wall 72 where it ends with a sealing lip 78. Externally the coating has cylindrical shape.

As can be easily understood, the set of the inner rolling races, on the cylindrical portion 10 of the fork 1, and of the outer rolling races, the semi-shells 7, 7, together with the balls 15 and their cage 6, form a rolling bearing. Naturally, it can also be obtained with rollers and the number of rows of rolling elements can differ from two, as shown. The bearing thus obtained is, advantageously, small in size, able to withstand axial loads, hermetically closed so as not to allow the introduction of dust or dirt which may reduce its working life. It is also easy to disassemble.

The semi-shells 7, 7 are contained inside the ring nut 2 which presents a conforming portion of interior profile delimited by lateral edges 20 and 21. Otherwise the ring nut 2, provided with a through cut which allows it to be widened for its positioning onto the fork, is of a conventional kind and hence is not described in any greater detail herein. Its function, in addition to containing the semi-shells 7, 7 is to create a connection with the protective casing 3 and with the tubular protective element 4, in a known way or in any other appropriate manner.

The mounting of the support device according to the present invention occurs in the manner explained below.

With reference to FIG. 2, once the balls 15 are housed inside the related seats on the cage 6, the two semi-shells 7, 7 are inserted in such a way that the cusp 74 of its inner profile passes over the edge 64 of the cage 6. Hence the cusp 74 interferes with the edges 63 and 64 of the cage 6, but not with its lateral band 62 lying between those edges.

In this first mounting phase the semi-assembled bearing is not in a completely closed position. In this position the semi-shells cannot be detached from the cage due, in fact, to the aforesaid interference between the cusp 74 of the semi-shells 7 and the edges 63 and 64 of the cage 6. In this position, the balls also remain imprisoned within their seats 60, being able to move only between the arc of circle profile 76 of the semi-shells 7 and the inner edge 61 of the seats 60. In this way the bearing is assembled and no component can exit therefrom, with considerable advantages for the subsequent mounting and for maintenance, when the bearing is not yet completely closed.

The bearing is then mounted onto the fork (see lower part of FIG. 1). The bearing is inserted longitudinally on the fork while not completely closed. The cage 6 obviously does not interfere with the cylindrical portion 10 of the fork 1. Thanks to the doubly arched profile 75, 76, the balls 15 project from their seats 60 to the extent sufficient for inserting the bearing onto the fork, but not sufficient to let them completely depart their seats and hence fall away.

When the balls 15 are in correspondence with the rolling races 13 and 14 on the cylindrical portion 10 of the fork, with a slight pressure the semi-shells 7, 7 are closed, until the cusp 74 passes over the borders 63 of the cage 6 in such a way as to hold the bearing in the completely closed position. Simultaneously, the balls 15 are thrust in their rolling races 13 and 14 on the fork by the arched profile 75 of the semi-shells 7. Therefore, in this position the bearing, in addition to remaining closed, remains axially fastened to the fork.

The subsequent mounting of the protective elements takes place in the conventional manner, as shown in the upper part of FIG. 1. The ring nut 2 is widened around the bearing, i.e. around the semi-shells 7, so that the lateral edges 20, 21 of the ring 2 further close the bearing, causing the cusps 74 to limit the play of the balls 15 in the seats 60 of the cage 66.

The "tolerance" closure of the bearing by the insertion of the ring nut 2 also causes the opposing surfaces 77 of the semi-shells 7, 7 to go into mutual contact with a determined pressure. This disposition, thanks also to the action of the sealing lips 78 on the external circumferential surface of the fork, realizes a hermetically sealed chamber such as not to allow the grease inserted inside the bearing to leak out, or pollutants like dusts or water to enter.

It should be noted that, in the final closure position, the semi-shells 7, 7 do not interfere with the cage 6 or with the fork 1, but only with the balls 15.

Thanks to the forcing action on the semi-shells 7, 7, the ring nut 2 becomes integral therewith. The ring nut in turn is held closed by the insertion of the protective cap or casing 3 and by the sleeve 5. Hence, the semi-shells become integral with the protective elements and thus doe not rotate during the operation of the transmission shaft.

With the disposition according to the invention, the bearing cannot open, the ring nut cannot become detached from the bearing and hence protection is motionless, but solidly fastened to the rotating telescoping shaft. The bearing thus realized can withstand axial and radial loads. Moreover, being hermetically sealed, it remains lubricated and its operating life is lengthened, since friction is rolling and heat production is reduced.

The invention thus conceived can be subject to numerous modifications and variations, without thereby departing from the scope of the inventive concept. For instance, the rolling elements can be rollers, instead of balls, and the bearing is modified accordingly. Moreover, all details can be replaced by technically equivalent elements.

What is claimed is:

1. A support device for elements protecting rotating shafts, in particular telescopic cardanic shafts, of the type in which, in each semi-shaft terminating with a fork, is present a support ring engaged with a protecting casing and with a protective tube and surrounded by a sealing sleeve, comprising at least an inner rolling race for rolling elements which is obtained circumferentially exterior in a cylindrical portion of said fork and at least an outer rolling race on two semi-shells coaxial to said fork and mutually opposite, and a cage for said rolling elements;

said semi-shells being contained between said ring, provided with retaining edges, and said cylindrical fork portion, wherein said rolling elements are balls, arranged in two rows, wherein said cage presents two lateral bands provided with radially projecting borders for holding said balls housed in seats of the cage fitted with a containment edge, wherein each of said semi-shells for two rows of balls, composed by a metal core and a rubber coating, presents an inner profile constituted by a lateral wall with radial development which, after a longitudinal segment, narrows radially to form a cusp, interfering with the borders of the cage to broaden subsequently in two arcs of circle;

the first arc, adjacent to the cusp, constituting the outer race for the rolling of a row of balls, and the second arc, radially exterior to the first arc, constituting the containment seat for the balls during the mounting phase.

2. A support device as claimed in claim 1, wherein said rubber coating of the semi-shells extends to cover externally said metal core of each semi-shell from a surface opposing the surface of the other semi-shell, forming a sealing lip in the side opposite to said surface.

* * * * *